US00RE48618E

(19) United States
(12) Reissued Patent
Park et al.

(10) Patent Number: US RE48,618 E
(45) Date of Reissued Patent: Jun. 29, 2021

(54) RADIO FREQUENCY TRANSCEIVER

(71) Applicant: ELECTRONICS AND TELECOMMUNICATIONS RESEARCH INSTITUTE, Daejeon (KR)

(72) Inventors: Bong-Hyuk Park, Daejeon (KR); Jong-Won Kim, Daejeon (KR); Yong-Il Jun, Daejeon (KR); Hyeong-Ho Lee, Daejeon (KR)

(73) Assignee: ELECTRONICS AND TELECOMMUNICATIONS RESEARCH INSTITUTE, Daejeon (KR)

(21) Appl. No.: 16/502,878

(22) Filed: Jul. 3, 2019

Related U.S. Patent Documents

Reissue of:
(64) Patent No.: 7,542,731
Issued: Jun. 2, 2009
Appl. No.: 10/831,633
Filed: Apr. 22, 2004

(30) Foreign Application Priority Data

Jul. 16, 2003 (KR) ..... 10-2003-0048805

(51) Int. Cl.
*H04B 1/28* (2006.01)
*H04B 1/405* (2015.01)

(52) U.S. Cl.
CPC ..... *H04B 1/28* (2013.01); *H04B 1/405* (2013.01)

(58) Field of Classification Search
CPC ..... H04B 1/28; H04B 1/405
See application file for complete search history.

(56) References Cited

U.S. PATENT DOCUMENTS

| | | | | |
|---|---|---|---|---|
| 4,426,627 | A * | 1/1984 | Yoshisato et al. | 331/12 |
| 4,811,424 | A * | 3/1989 | Cox | 455/260 |
| 6,351,502 | B1 * | 2/2002 | Zargari | 375/324 |
| 6,366,764 | B1 | 4/2002 | Yang et al. | |
| 6,961,546 | B1 * | 11/2005 | Rofougaran et al. | 455/118 |
| 7,194,044 | B2 * | 3/2007 | Birkett et al. | 375/324 |
| 2002/0034932 | A1 * | 3/2002 | Welland | 455/260 |
| 2003/0007550 | A1 * | 1/2003 | Cook et al. | 375/219 |
| 2003/0063690 | A1 | 4/2003 | Paulus et al. | |
| 2003/0119466 | A1 * | 6/2003 | Goldman | 455/260 |
| 2003/0219067 | A1 * | 11/2003 | Birkett et al. | 375/219 |
| 2007/0015471 | A1 * | 1/2007 | Cook et al. | 455/76 |

FOREIGN PATENT DOCUMENTS

| | | |
|---|---|---|
| KR | 1998026710 | 7/1998 |
| KR | 20020047542 | 6/2002 |

* cited by examiner

*Primary Examiner* — Woo H. Choi

(57) ABSTRACT

Provided is a radio frequency transceiver. The radio frequency transceiver includes: a receiving unit for converting a radio frequency signal received by an antenna into an intermediate signal based on an intermediate local signal; a transmitting unit for converting an intermediate signal into a radio frequency signal based on a radio frequency local signal; and a local signal generating unit for generating the intermediate local signal and the radio frequency local signal.

4 Claims, 3 Drawing Sheets

RADIO FREQUENCY TRANSCEIVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a radio frequency transceiver; and, more particularly to a radio frequency transceiver which uses a voltage control oscillator and a phase locked loop for both of a transmitting unit and a receiving unit of the transceiver, and reduces the number of components and chip size of the transceiver.

DESCRIPTION OF RELATED ART

FIG. 1 is a diagram showing a conventional transceiver.

As shown, in a transmitting unit of the conventional transceiver, an in-phase signal and a quadrature-phase signal, which are converted from digital signals to analog signals in a baseband modem (not shown), are mixed with a local signal from a local oscillator (LO) in up-converters 111 and 112 to generate radio frequency signals, amplified in a power amplifier (PA) 113, filtered in a bandpass filter (BPF) 102 and radiated through an antenna 101.

In a receiving unit of the conventional transceiver, a signal received by the antenna 101 is transferred to a low noise amplifier (LNA) 105 through the BPF 102, a balance to unblance transformer (Balun) 104. The received signal is amplified in the LNA 105, mixed with signals generated by the LO 109 to generate an intermediate signal in a mixer 109. The intermediate signal is modulated in down converters 107 and 108 based on the four-divided signal of the local oscillation signal to generate an in-phase signal and a quadrature-phase signal.

In the conventional transceiver, a different local oscillator is used for the transmitting unit and the receiving unit, and the oscillation signal generated for the transmitting unit raises interference at the receiving unit, to thereby decrease performance of the transceiver.

SUMMARY OF THE INVENTION

It is, therefore, an object of the present invention to provide a radio frequency transceiver which uses a voltage control oscillator and a phase locked loop for both of a transmitting unit and a receiving unit of the transceiver, and reduces the number of components and chip size of the transceiver.

In one aspect of the present invention, there is provided an apparatus for transmitting/receiving a radio frequency signal, including: a receiving unit for converting a radio frequency signal received by an antenna into an intermediate signal based on an intermediate local signal; a transmitting unit for converting an intermediate signal into a radio frequency signal based on a radio frequency local signal; and a local signal generating unit for generating the intermediate local signal and the radio frequency local signal.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
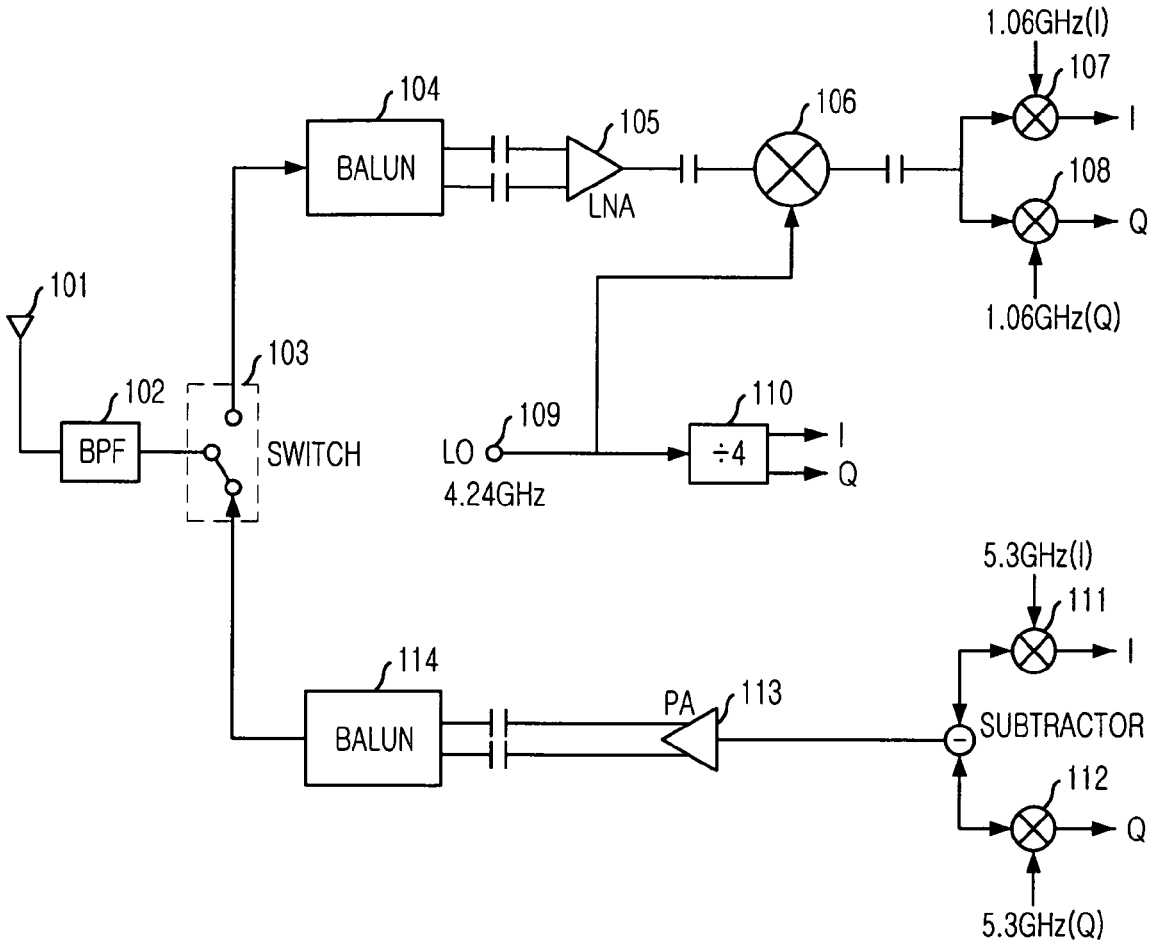
FIG. 1 (PRIOR ART)
FIG. 1 is a diagram showing a conventional transceiver.

Other objects and aspects of the invention will become apparent from the following description of the embodiments with reference to the accompanying drawings, which is set forth hereinafter. Here, the same reference numeral is given to the same element, even though it appears in different drawings.

Figure 2:
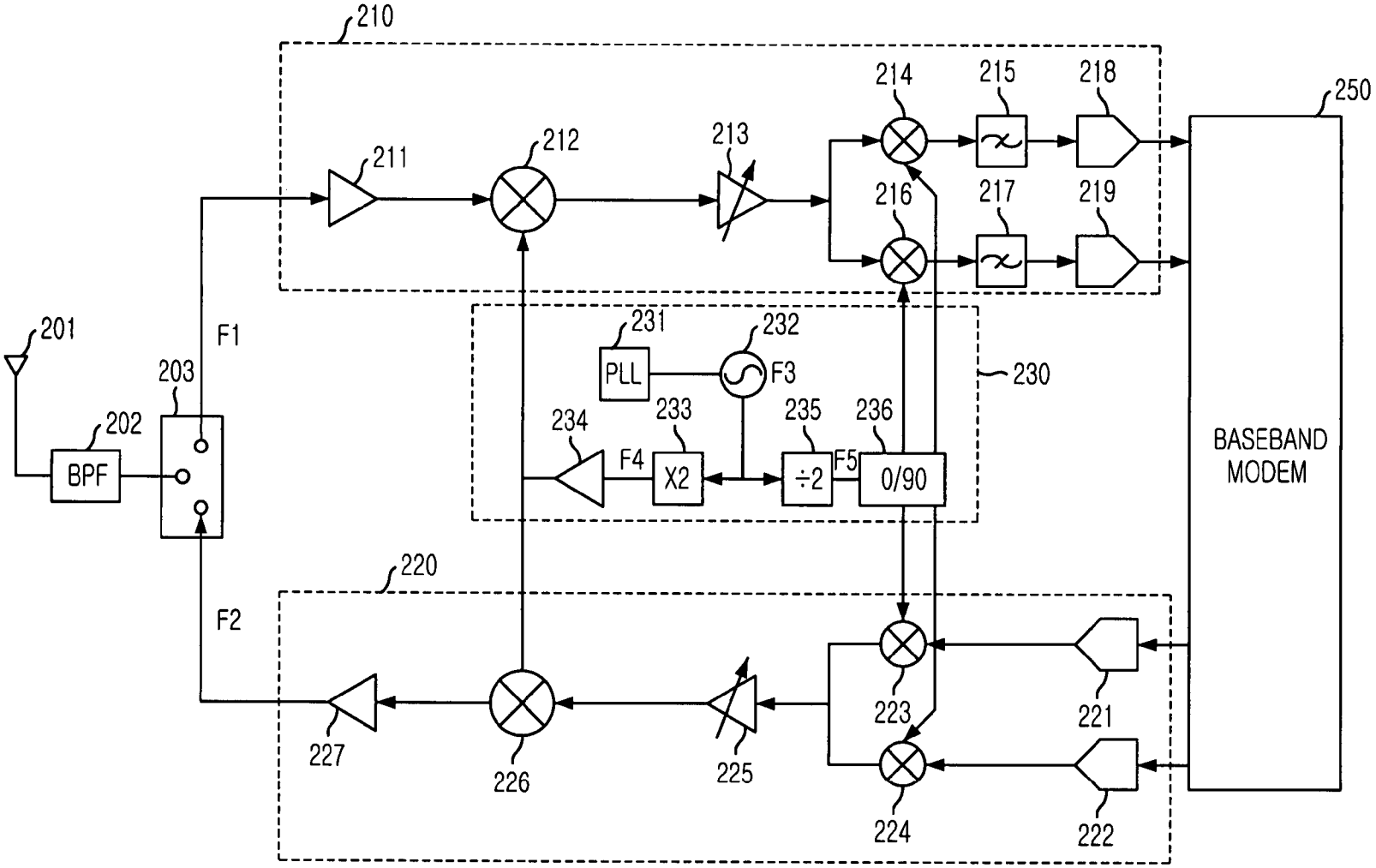
FIG. 2 is a diagram depicting a transceiver in accordance with an embodiment of the present invention.

FIG. 2 is a diagram depicting a transceiver in accordance with an embodiment of the present invention.

As shown, the transceiver includes an antenna 201, a bandpass filter 202, a switch 203, a receiving unit 210, a transmitting unit 220, a local signal generating unit 230, and a baseband modem 250.

The transmitting unit 220 receives a digital signal outputted from the baseband modem 250, transmits a radio frequency (RF) signal, and includes digital-to-analog (D/A) converters 221 and 222, an in-phase and quadrature-phase (IQ) modulator 223 and 224, a transmitting automatic gain controller (AGC) 225, an up-converter 224 and an amplifier 226.

The digital signals from the baseband modem 250 is converted into analog signals to generate an analog in-phase signal and an analog quadrature-phase signal in the D/A converters 221 and 222. In the IQ modulator 223 and 224, the analog in-phase signal and the analog quadrature-phase signal are modulated based on a signal of which a center frequency is F5 and combined to generate a modulated signal. A gain of the modulated signal is controlled in the transmitting AGC 225, converted into an intermediate signal based on a signal of which a center frequency is F4 in the up-converter 226 and amplified by an amplifier 227. The amplified intermediate signal is transmitted by the antenna 201 through the bandpass filter 202.

The receiving unit 210 includes a low noise amplifier 211, a down-converter 212, a receiving automatic gain controller (AGC) 213, IQ demodulators 214 and 216, bandpass filters 215 and 217, analog-to-digital (A/D) converters 218 and 219.

A signal received by the antenna 201 is transmitted to the low noise amplifier 211 to be amplified through the bandpass filter 202 and the switch 203. In the down-converter 212, the amplified signal is converted into an intermediate signal based on a local signal generated by the local signal generating unit 230. The center frequency of the local signal is F5. The intermediate signal is demodulated to generate an in-phase (I) signal and a quadrature-phase (Q) signal in the IQ demodulators 214 and 216, and then transferred to the baseband modem 250 through the bandpass filters 215 and 217 and the A/D converters 218 and 219.

The local signal generating unit 230 generates local signals and includes a phase locked loop (PLL) 231, a voltage controlled oscillator (VCO) 232, a multiplier 233, an amplifier 234, a divider 235 and a phase shifter 236.

A transmission channel is selected in the PLL 231, and a local signal of which a center frequency is F3 is generated for the selected channel in the VCO 232. The local signal is multiplied by 2 to generate a signal of which the center frequency is F4 in the multiplier 233 and divided by 2 to generate a signal of which the center frequency is F5 in the multiplier 235.

The center frequency F5 is obtained by equations as:

$$F1(\text{or } F2)-2\times F3=F5 \quad \text{Eq. (1)}$$

$$F5-F3\div 2 \quad \text{Eq. (2)}$$

Figure 3:
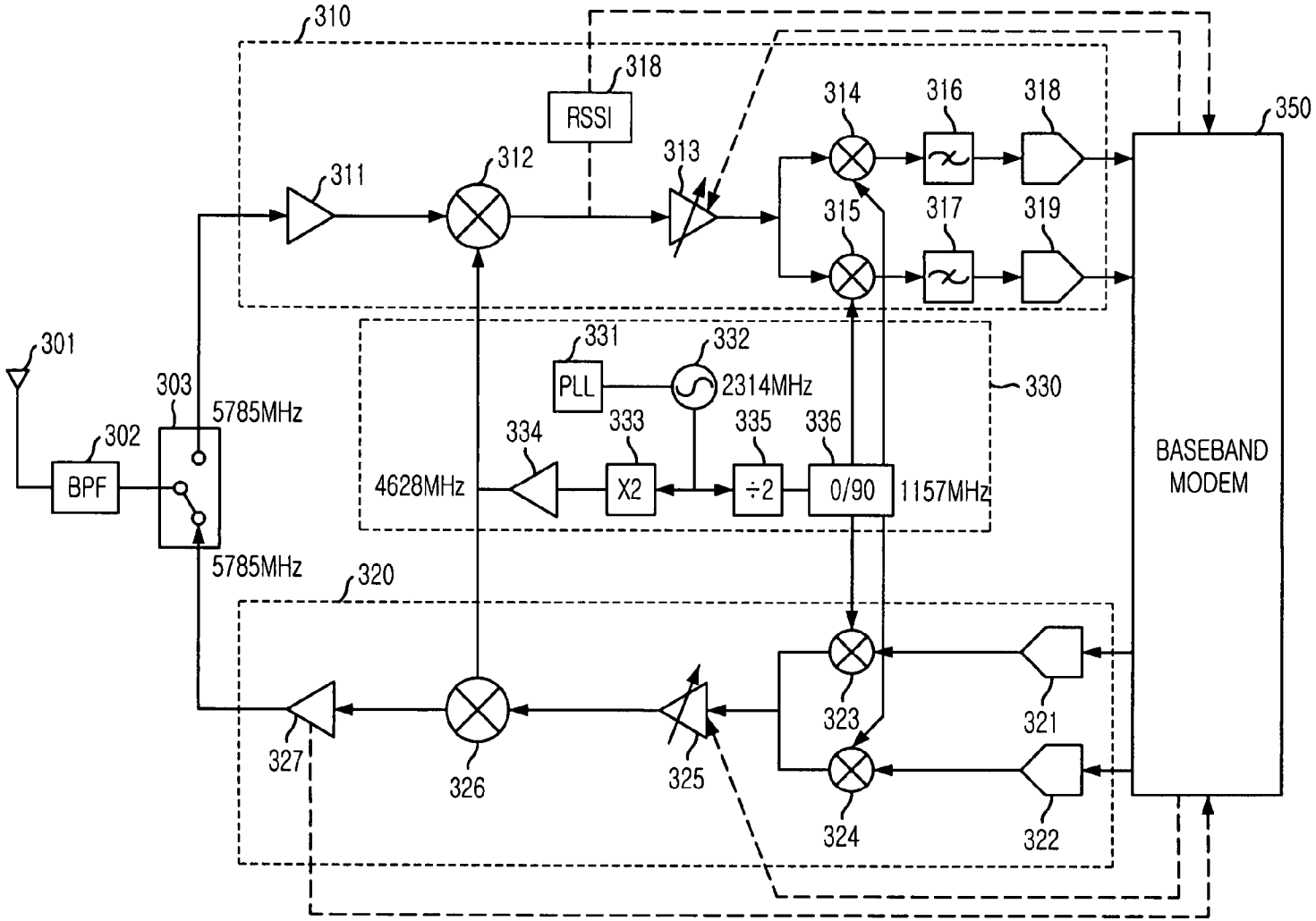
FIG. 3 is a diagram illustrating a transceiver in accordance with another embodiment of the present invention.

FIG. 3 is a diagram illustrating a transceiver in accordance with an embodiment of the present invention. In this embodiment, the transceiver is for a 5 GHz radio local area network (LAN) which is based on IEEE802.11a standard.

The radio LAN transceiver sets a radio frequency 5,785 MHz, which is one of 12 transmission channels.

When transmitting a signal, the digital signal from the baseband modem 350 is converted into analog signal to generate an analog in-phase signal and an analog quadrature-phase signal in the D/A converters 321 and 322. In the IQ modulators 323 and 324, the analog in-phase signal and the analog quadrature-phase signal are modulated based on a second local signal of which a center frequency is 1,157 MHz and combined to generate a modulated signal. A gain of the modulated signal is controlled in the transmitting AGC 325, converted into an intermediate signal based on a third local signal of which a center frequency is 4,628 MHz in the up-converter 326 and amplified by an amplifier 327. The amplified intermediate signal is transmitted by the antenna 301 through the bandpass filter 302.

In the receiving unit 310, a receiving level is detected by a received signal strength indicator (RSSI) 318 and transmitted to the baseband modem 350. The baseband modem 350 provides a control signal to a receiving AGC 313 to maintain the receiving level as a predetermined value.

If the PLL 331 of the local signal generator selects the eleventh channel, the voltage controlled oscillator 332 generates a first local signal of which center frequency is 2,314 MHz. The first local signal is multiplied and divided by two to generate the second local signal and the third local signal. The third local signal is transmitted to the up-converter 326 and the down-converter 312. The second local signal is transmitted to the IQ modulator 323, 324 and the IQ demodulator 314, 315.

In the IEEE802.11a standard, frequencies of 5 GHz RF band, a local band and an IF band in each channel are expressed in Table 1.

TABLE 1

| Channel No. | RF band (MHz) | Local band (MHz) | IF band (MHz) |
|---|---|---|---|
| 1 | 5180 | 2072 | 1036 |
| 2 | 5200 | 2080 | 1040 |
| 3 | 5220 | 2088 | 1044 |
| 4 | 5240 | 2096 | 1048 |
| 5 | 5260 | 2104 | 1052 |
| 6 | 5280 | 2112 | 1056 |
| 7 | 5300 | 2120 | 1060 |
| 8 | 5320 | 2128 | 1064 |
| 9 | 5745 | 2298 | 1149 |
| 10 | 5765 | 2306 | 1153 |
| 11 | 5785 | 2314 | 1157 |
| 12 | 5805 | 2322 | 1161 |

In the heterodyne radio frequency transceiver in accordance with the present invention, the same voltage controlled oscillator (VCO) and the phase locked loop (PLL) generate both of an RF band signal and an IF band signal, and then the transceiver has smaller number of components. Accordingly, the transceiver has a simple structure, a low manufacturing expense. If the transceiver is manufactured as a one-chip, the chip size can be considerably reduced. Further, because the intermediate frequency is different from the frequency of the VCO in the receiving unit, DC offset is reduced and the performance of the transceiver is increased.

While the present invention has been described with respect to certain preferred embodiments, it will be apparent to those skilled in the art that various changes and modifications may be made without departing from the scope of the invention as defined in the following claims.

What is claimed is:

1. An apparatus for transmitting/receiving a radio frequency signal, comprising:

a receiving means for converting a radio frequency signal received by an antenna into an intermediate signal based on [an intermediate frequency (IF) band local signal] *a radio frequency* (*RF*) *band local signal*;

a transmitting means for converting an intermediate signal into a radio frequency signal based on [a radio frequency (RF)] *the RF* band local signal; and a local signal generating means for generating [the IF] *an intermediate frequency* (*IF*) band local signal and the RF band local signal, wherein said local signal generating means includes:

a phase locked loop (PLL) for both the receiving means and the transmitting means for selecting a channel to reduce interference with the radio frequency signal;

a voltage control oscillator for generating a first local signal based on the channel selected by the PLL;

a multiplier for multiplying the frequency of the first local signal by a predetermined number to generate a multiplied signal;

an amplifier for amplifying the multiplied signal to generate the RF band local signal;

a divider for dividing the frequency of the first local signal by a predetermined number to generate a divided signal; and a phase shifter for shifting a phase of the divided signal to generate the IF band local signal.

2. The apparatus as recited in claim 1, wherein said receiving means includes:

a low noise amplifier for amplifying the received signal to generate an amplified radio frequency signal;

a down-converter for converting the amplified radio frequency signal into the intermediate signal by combining the [amplitied] *amplified* radio frequency signal and the [IF] *RF* band local signal;

a receiving gain controller for controlling a level of the intermediate signal;

a demodulator for demodulating the intermediate signal based on the IF band local signal to generate an in-phase signal and a quadrature-phase signal;

a filter for removing radio frequency noises included in the in-phase signal and the quadrature-phase signal, to thereby generate a filtered in-phase signal and a quadrature-phase signal; and an analog-to-digital (A/D) converter for converting the filtered in-phase signal and the quadrature-phase signal to digital in-phase and quadrature-phase signals.

3. The apparatus as recited in claim 1, wherein said transmitting means includes:

a digital-to-analog (D/A) converter for converting [the] signals from [the] *a* baseband modem to analog signals;

a modulator for modulating the analog signals into intermediate signals based on the IF band local signal to generate a modulated signal;

a transmitting gain controller for controlling a level of the modulated signal to generate a gain controlled signal;

an up-converter for converting the gain controlled signal which is in IF band to a radio frequency signal based on the RF band local signal; and an amplifier for amplifying the radio frequency signal.

4. The apparatus as recited in claim 1, further including:

switching means for allowing one of said receiving means and said transmitting means to be operated; and filtering means for removing noise of the [transmission] *radio frequency* signal and the received signal.

* * * * *